United States Patent
Patel et al.

(10) Patent No.: US 6,831,043 B2
(45) Date of Patent: Dec. 14, 2004

(54) HIGH PERFORMANCE WATER BASED DRILLING MUD AND METHOD OF USE

(75) Inventors: Arvind D. Patel, Sugar Land, TX (US); Emanuel Stamatakis, Houston, TX (US); Eric Davis, Houston, TX (US); Jim Friedheim, Spring, TX (US)

(73) Assignee: M-I LLC, Houston, TX (US)

( * ) Notice: Subject to any disclaimer, the term of this patent is extended or adjusted under 35 U.S.C. 154(b) by 341 days.

(21) Appl. No.: 10/062,071

(22) Filed: Jan. 31, 2002

(65) Prior Publication Data

US 2003/0155157 A1 Aug. 21, 2003

(51) Int. Cl.$^7$ ............................................. C09K 7/02
(52) U.S. Cl. .................... 507/133; 507/246; 507/111; 507/212; 175/64
(58) Field of Search ............................... 507/133, 246, 507/111, 212, 117, 219; 175/64

(56) References Cited

U.S. PATENT DOCUMENTS

| | | | |
|---|---|---|---|
| 2,470,831 A | * | 5/1949 | Monson ...................... 507/244 |
| 3,404,165 A | * | 10/1968 | Budde et al. ................ 554/105 |
| 3,956,141 A | | 5/1976 | Walker |
| 4,792,412 A | | 12/1988 | Heilweil |
| 4,942,929 A | | 7/1990 | Malachosky et al. |
| 5,129,469 A | | 7/1992 | Jackson |
| 5,226,749 A | | 7/1993 | Perkins |
| 5,260,268 A | | 11/1993 | Forsberg et al. |
| 5,310,285 A | | 5/1994 | Northcott |
| 5,314,265 A | | 5/1994 | Perkins et al. |
| 5,330,662 A | | 7/1994 | Jahnke et al. |
| 5,339,912 A | | 8/1994 | Hosie et al. |
| 5,358,049 A | | 10/1994 | Hale et al. |
| 5,380,706 A | | 1/1995 | Himes et al. |
| 5,405,223 A | | 4/1995 | Sirevag |
| 5,405,224 A | | 4/1995 | Aubert et al. |
| 5,424,284 A | | 6/1995 | Patel et al. |
| 5,427,999 A | * | 6/1995 | Clewlow et al. ............ 507/241 |
| 5,480,863 A | | 1/1996 | Oakley et al. |
| 5,558,161 A | | 9/1996 | Vitthal et al. |
| 5,558,171 A | | 9/1996 | McGlothlin et al. |
| 5,589,603 A | | 12/1996 | Alexander et al. |
| 5,593,952 A | | 1/1997 | Jarrett |
| 5,662,169 A | | 9/1997 | Hosie |
| 5,741,758 A | | 4/1998 | Pakulski |
| 5,771,971 A | | 6/1998 | Horton et al. |
| 5,789,352 A | | 8/1998 | Carpenter et al. |
| 5,804,535 A | | 9/1998 | Dobson et al. |
| 5,908,814 A | | 6/1999 | Patel et al. |
| 5,961,438 A | | 10/1999 | Ballantine et al. |
| 6,054,416 A | | 4/2000 | Bland |
| 6,063,737 A | | 5/2000 | Haberman et al. |
| 6,103,671 A | | 8/2000 | Dobson et al. |
| 6,106,733 A | | 8/2000 | Wood |
| 6,119,779 A | | 9/2000 | Gipson et al. |
| 6,124,244 A | | 9/2000 | Murphey |
| 6,213,213 B1 | | 4/2001 | van Batenburg et al. |
| 6,247,543 B1 | * | 6/2001 | Patel et al. .................... 175/64 |
| 6,331,508 B1 | * | 12/2001 | Pakulski ....................... 507/90 |
| 6,484,821 B1 | * | 11/2002 | Patel et al. .................... 175/64 |
| 6,609,578 B2 | * | 8/2003 | Patel et al. .................... 175/64 |
| 2002/0092681 A1 | * | 7/2002 | Patel et al. .................... 175/64 |
| 2003/0106718 A1 | * | 6/2003 | Patel et al. .................... 175/64 |

FOREIGN PATENT DOCUMENTS

| | | | |
|---|---|---|---|
| CA | 876019 A | 7/1971 | |
| CA | 1185779 A | 4/1985 | ............ C09K/7/02 |
| CA | 2088344 A1 | 6/1987 | ............ C09K/7/02 |
| DE | 3238394 A | 4/1984 | ........... A01N/33/12 |
| DE | 272287 A1 | 10/1989 | ............ C01B/33/26 |
| EP | 0125957 A1 | 4/1984 | ............ C09K/7/02 |
| EP | 0182669 A1 | 5/1986 | ............ C07C/93/04 |
| EP | 0241340 A1 | 3/1987 | ............ C09K/7/02 |
| EP | 0330379 A2 | 8/1989 | ............ C11D/3/43 |
| EP | 0634468 A1 | 1/1995 | ............ C09K/7/02 |
| EP | 0838514 A1 | 4/1998 | ............ C09K/7/02 |
| GB | 2164370 A | 3/1986 | ............ C09K/7/02 |
| GB | 2175291 A | 11/1986 | ............ C01B/33/20 |
| GB | 2328228 A | 2/1999 | ............ C09K/7/02 |
| WO | 88/07499 A1 | 10/1988 | ............ C02F/1/56 |
| WO | 90/07337 A1 | 7/1990 | ............ A61K/31/74 |
| WO | 93/02151 A1 | 2/1993 | ............ C09K/7/00 |
| WO | 01/59028 A2 | 8/2001 | ............ C09K/5/00 |
| WO | 01/59028 A3 | 2/2002 | ............ C09K/7/02 |
| WO | 02/38697 A2 | 5/2002 | ............ C09K/7/02 |
| WO | 02/102922 A1 | 12/2002 | ............ C09K/7/02 |

* cited by examiner

Primary Examiner—Philip C. Tucker
(74) Attorney, Agent, or Firm—Howrey Simon Arnold & White LLP

(57) ABSTRACT

A water-base fluid for use in drilling wells and other drilling operation includes a shale clay which swells in the presence of water. The fluid preferably includes: an aqueous based continuous phase, and a shale hydration inhibition agent having the formula:

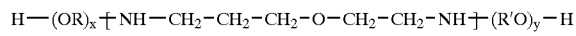

wherein R and R' are independently selectable alkylene groups having 2 to 4 carbon atoms, and wherein x and y have independently selected values such that the sum of x and y is at least 1. The shale hydration inhibition agent should be present in sufficient concentration to reduce the swelling of the shale clay. The fluid may be used for formulating drilling fluids such as water-base drilling muds or clear brine drilling fluids. The fluid may also be used in the slurrification and disposal of drill cuttings that contain water swellable clays or shale clays.

22 Claims, No Drawings

HIGH PERFORMANCE WATER BASED DRILLING MUD AND METHOD OF USE

BACKGROUND OF THE INVENTION

In rotary drilling of subterranean wells numerous functions and characteristics are expected of a drilling fluid. A drilling fluid should circulate throughout the well and carry cuttings from beneath the bit, transport the cuttings up the annulus, and allow their separation at the surface. At the same time, the drilling fluid is expected to cool and clean the drill bit, reduce friction between the drill string and the sides of the hole, and maintain stability in the borehole's uncased sections. The drilling fluid should also form a thin, low permeability filter cake that seals openings in formations penetrated by the bit and act to reduce the unwanted influx of formation fluids from permeable rocks.

Drilling fluids are typically classified according to their base material. In oil based fluids, solid particles are suspended in oil, and water or brine may be emulsified within the oil. The oil is typically the continuous phase. In water based fluids, solid particles are suspended in water or brine, and oil may be emulsified in the water. The water is typically the continuous phase. Pneumatic fluids are a third class of drilling fluids in which a high velocity stream of air or natural gas removes drill cuttings.

Three types of solids are usually found in water base drilling fluids: 1) clays and organic colloids added to provide necessary viscosity and filtration properties; 2) heavy minerals whose function is to increase the drilling fluid's density; and 3) formation solids that become dispersed in the drilling fluid during the drilling operation.

The formation solids that become dispersed in a drilling fluid are typically the cuttings produced by the drill bit's action and the solids produced by borehole instability. Where the formation solids are clay minerals that swell, the presence of either type of formation solids in the drilling fluid can greatly increase drilling time and costs.

Clay minerals are generally crystalline in nature. The structure of a clay's crystals determines its properties. Typically, clays have a flaky, mica-type structure. Clay flakes are made up of a number of crystal platelets stacked face-to-face. Each platelet is called a unit layer, and the surfaces of the unit layer are called basal surfaces.

A unit layer is composed of multiple sheets. One sheet is called the octahedral sheet, it is composed of either aluminum or magnesium atoms octahedrally coordinated with the oxygen atoms of hydroxyls. Another sheet is called the tetrahedral sheet. The tetrahedral sheet consists of silicon atoms tetrahedrally coordinated with oxygen atoms.

Sheets within a unit layer link together by sharing oxygen atoms. When this linking occurs between one octahedral and one tetrahedral sheet, one basal surface consists of exposed oxygen atoms while the other basal surface has exposed hydroxyls. It is also quite common for two tetrahedral sheets to bond with one octahedral sheet by sharing oxygen atoms. The resulting structure, known as the Hoffman structure, has an octahedral sheet that is sandwiched between the two tetrahedral sheets. As a result, both basal surfaces in a Hoffman structure are composed of exposed oxygen atoms.

The unit layers stack together face-to-face and are held in place by weak attractive forces. The distance between corresponding planes in adjacent unit layers is called the c-spacing. A clay crystal structure with a unit layer consisting of three sheets typically has a c-spacing of about $9.5 \times 10^{-7}$ mm.

In clay mineral crystals, atoms having different valences commonly will be positioned within the sheets of the structure to create a negative potential at the crystal surface. In that case, a cation is adsorbed on the surface. These adsorbed cations are called exchangeable cations because they may chemically trade places with other cations when the clay crystal is suspended in water. In addition, ions may also be adsorbed on the clay crystal edges and exchange with other ions in the water.

The type of substitutions occurring within the clay crystal structure and the exchangeable cations adsorbed on the crystal surface greatly affect clay swelling, a property of primary importance in the drilling fluid industry. Clay swelling is a phenomenon in which water molecules surround a clay crystal structure and position themselves to increase the structure's c-spacing thus resulting in an increase in volume. Two types of swelling may occur.

Surface hydration is one type of swelling in which water molecules are adsorbed on crystal surfaces. Hydrogen bonding holds a layer of water molecules to the oxygen atoms exposed on the crystal surfaces. Subsequent layers of water molecules align to form a quasi-crystalline structure between unit layers which results in an increased c-spacing. Virtually all types of clays swell in this manner.

Osmotic swelling is a second type of swelling. Where the concentration of cations between unit layers in a clay mineral is higher than the cation concentration in the surrounding water, water is osmotically drawn between the unit layers and the c-spacing is increased. Osmotic swelling results in larger overall volume increases than surface hydration. However, only certain clays, like sodium montmorillonite, swell in this manner.

Exchangeable cations found in clay minerals are reported to have a significant impact on the amount of swelling that takes place. The exchangeable cations compete with water molecules for the available reactive sites in the clay structure. Generally cations with high valences are more strongly adsorbed than cations with low valences. Thus, clays with low valence exchangeable cations will swell more than clays whose exchangeable cations have high valences.

In the North Sea and the United States Gulf Coast, drillers commonly encounter argillaceous sediments in which the predominant clay mineral is sodium montmorillonite (commonly called "gumbo shale"). Sodium cations are predominately the exchangeable cations in gumbo shale. As the sodium cation has a low positive valence (i.e. formally a +1 valence), it easily disperses into water. Consequently, gumbo shale is notorious for its swelling.

Clay swelling during the drilling of a subterranean well can have a tremendous adverse impact on drilling operations. The overall increase in bulk volume accompanying clay swelling impedes removal of cuttings from beneath the drill bit, increases friction between the drill string and the sides of the borehole, and inhibits formation of the thin filter cake that seals formations. Clay swelling can also create other drilling problems such as loss of circulation or stuck pipe that slow drilling and increase drilling costs. Thus, given the frequency in which gumbo shale is encountered in drilling subterranean wells, the development of a substance and method for reducing clay swelling remains a continuing challenge in the oil and gas exploration industry.

One method to reduce clay swelling is to use salts in drilling fluids. Salts generally reduce the swelling of clays. However, salts flocculate the clays resulting in both high fluid losses and an almost complete loss of thixotropy. Further, increasing salinity often decreases the functional characteristics of drilling fluid additives.

Another method for controlling clay swelling is to use organic shale inhibitor molecules in drilling fluids. It is believed that the organic shale inhibitor molecules are adsorbed on the surfaces of clays with the added organic shale inhibitor competing with water molecules for clay reactive sites and thus serve to reduce clay swelling.

Organic shale inhibitor molecules can be either cationic, anionic, or nonionic. Cationic organic shale inhibitors dissociate into organic cations and inorganic anions, while anionic organic shale inhibitors dissociate into inorganic cations and organic anions. Nonionic organic shale inhibitor molecules do not dissociate.

It is important that the driller of subterranean wells be able to control the rheological properties of drilling fluids by using additives, including organic shale inhibitor molecules. In the oil and gas industry today it is desirable that additives work both onshore and offshore and in fresh and salt water environments. In addition, as drilling operations impact plant and animal life, drilling fluid additives should have low toxicity levels and should be easy to handle and to use to minimize the dangers of environmental pollution and harm to operators. Any drilling fluid additive should also provide desirable results but should not inhibit the desired performance of other additives. The development of such additives will help the oil and gas industry to satisfy the long felt need for superior drilling fluid additives which act to control the swelling of the clay and drilled formations without adversely effecting the Theological properties of drilling fluids. The present invention addresses this need.

SUMMARY OF THE INVENTION

The present invention is generally directed to a water-base drilling fluid for use in drilling wells through a formation containing hydrophilic rock formations that swell in the presence of water. The inventive drilling fluid includes: an aqueous based continuous phase; a weight material; and a shale hydration inhibition agent. Preferably the shale hydration inhibition agent has a formula:

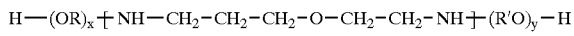

in which R and R' are independently selectable alkylene group having 2 to 4 carbon atoms, and x and y have independently selected values such that the sum of x and y is at least 1. The shale hydration inhibition agent should be present in a sufficient concentration to reduce the swelling of gumbo shale or other hydrophilic rocks encountered during the drilling of wells with the inventive drilling fluid. The alkylene groups, R and R' may be the same or they may be different from each other and may include a mixture of alkylene groups. That is to say that R and R' may have a mixture of a different number of carbon atoms.

Another illustrative embodiment of the present invention is a water-base drilling fluid as described above in which the shale hydration inhibition agent may be selected from compounds having the formula:

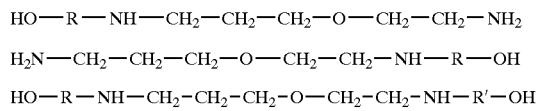

in which R and R' are independently selected alkylene groups having 2 to 4 carbon atoms and mixtures of such compounds and mixtures of these, and similar compounds. As with the previously described drilling fluid, the hydration inhibition agent should be present in the drilling fluid in sufficient concentrations to reduce the swelling of gumbo shale or other hydrophilic rocks encountered during the drilling of wells with the inventive drilling fluid.

Further the shale hydration inhibition agents should preferably be characterized by a relatively low toxicity as measured by the Mysid shrimp test and compatibility with anionic drilling fluid components that may be present in the drilling fluid. The United States Environmental Protection Agency has specified a Mysid shrimp bioassay as the means for assessing marine aquatic toxicity of drilling fluids. A detailed account of the procedure for measuring toxicity of drilling fluids is described in Duke, T. W., Parrish, P. R.; "Acute Toxicity of Eight Laboratory Prepared Generic Drilling Fluids to Mysids (Mysidopsis)" 1984 EPA-600/3-84-067, the subject matter of which is incorporated herein by reference.

For purposes of understanding the term "low toxicity" within the context of this application, the term refers to a drilling fluid with an LC50 of greater than 30,000 ppm by the Mysid shrimp test. Although 30,000 has been the number used for purposes of evaluation it should not be considered a limitation on the scope of this invention. Rather, the tests provide a context for use of the term "low toxicity" as used in the present invention that will be readily understood by those with ordinary skill in the art. Other LC50 values may be viable in various environmental settings. An LC50 value of greater than 30,000 has been equated to an "environmentally compatible" product.

The drilling fluids of the present invention preferably have an aqueous based continuous phase selected from: fresh water, sea water, brine, mixtures of water and water soluble organic compounds and mixtures thereof. In addition such a drilling fluid may further contain a fluid loss control agent selected from the group of organic synthetic polymers, biopolymers and sized particle diatomaceous earth, and mixtures thereof. It is in the scope of the present invention that the drilling fluid may further contain an encapsulating agent such as one preferably selected from the group consisting of organic and inorganic polymers and mixtures thereof. A weight material may also be included in the formulation of the drilling fluid with the weighting agent preferably being selected from the group of barite, hematite, iron oxide, calcium carbonate, magnesium carbonate, soluble and insoluble organic and inorganic salts, and combinations thereof.

Also inclusive within the present invention is a method of reducing the swelling of shale clay in a well comprising circulating in the well a water-base drilling fluid formulated in accordance with the present invention.

These and other features of the present invention are more fully set forth in the following description of illustrative embodiments of the invention.

DESCRIPTION OF ILLUSTRATIVE EMBODIMENTS

The present invention is directed to a water-base drilling fluid for use in drilling wells through a formation containing a shale clay which swells in the presence of water. As the terms are used herein, shale, clay, shale clay, and gumbo shale have been used to describe hydrophilic rocks that may be encountered during the drilling of wells and which the drilling fluids of the present invention inhibit the swelling as described above. Generally the drilling fluid of the present invention includes a weight material, a shale hydration inhibition agent and an aqueous continuous phase. As disclosed below, the drilling fluids of the present invention may also include additional components, such as fluid loss control agents, bridging agents, lubricants, anti-bit balling agents, corrosion inhibition agents, surfactants and suspending agents and the like which may be added to an aqueous based drilling fluid.

The shale hydration inhibition agent of the present invention is preferably the reaction product of a polyoxyalkylenediamine with alkylene oxide. The resulting compound inhibits the swelling of shale clay that may be encountered during the drilling process.

Polyoxyalkyleneamines are a general class of compounds that contain primary amino groups attached to the terminus of a polyether backbone. They are thus "polyether amines" that may be monoamines, diamines or triamines in a variety of molecular weights, ranging up to 5,000. The polyether backbone is based either on propylene oxide (PO), ethylene oxide (EO), or mixed ethylene oxide/propylene oxide (EO/PO) groups. One commercial source of such compounds is Huntsman Chemical and their JEFFAMINE® product family. In the present invention, the alkylene group of the polyoxyalkylenediamine is a straight chain alkylene, that may be the same (i.e. all ethylene units), different (i.e. methylene, ethylene, propylene, etc . . . ) or mixtures of alkylene groups. Branched alkylene group may also be used to form the polyether backbone.

Alkylene oxide compounds are a general class of compounds in which an oxo group is bound to two adjacent carbon atoms to form a triangular ring. Often referred to as an epoxy group, such compounds are reactive with the amine functionality groups of the polyoxyalkylenediamine to form the compounds useful in the practice of the present invention. By way of example, the reaction of two molar equivalents of ethylene oxide (i.e. oxirane) with a polyoxyalkylenediamine in which the polyether backbone is made of ethylene and propylene oxide can be represented with the following formula:

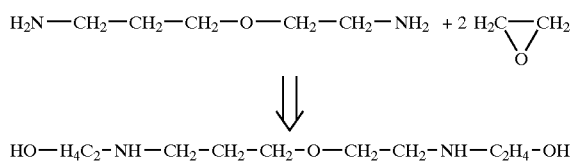

The conditions for carrying out such a reaction should be well known to one of ordinary skill in the art of organic synthesis.

The above reaction may be carried out with a wide variety of alkylene oxide compounds. For example, ethylene oxide, propylene oxide, butylene oxide and so forth may all be used. Further, other synthetic pathways may be used to achieve the same target compounds used in the present invention. Such alternative pathways will be apparent to one of skill in the art of organic synthesis.

While a variety of members of this group of compounds may serve as shale inhibition agents, we have found that compounds having the generic formula

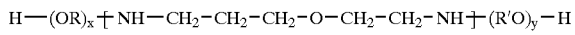

in which R and R' are independently selectable alkylene groups having 2 to 4 carbon atoms, and x and y have independently selected values such that the sum of x and y is at least 1 and less than 20 useful as shale inhibition agents. An important property in the selection of the shale inhibition agents of the present invention is that the selected compounds or mixture of compounds should provide effective inhibition of shale hydration when the shale clay is exposed to the drilling fluid.

In one preferred illustrative embodiment of the present invention the shale hydration inhibition agent may be selected from compounds having the formula:

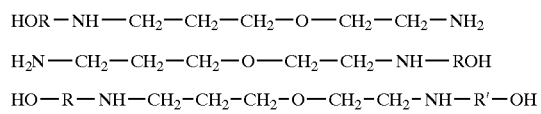

in which R and R' are independently selected alkylene groups having 2 to 4 carbon atoms and mixtures of such compounds and mixtures of these, and similar compounds.

The shale hydration inhibition agent should be present in sufficient concentration to reduce either or both the surface hydration based swelling and/or the osmotic based swelling of the shale clay. The exact amount of the shale hydration inhibition agent present in a particular drilling fluid formulation can be determined by a trial and error method of testing the combination of drilling fluid and shale clay formation encountered. Generally however, the shale hydration inhibition agent of the present invention may be used in drilling fluids in a concentration from about 1 to about 18 pounds per barrel (lbs/bbl or ppb) and more preferably in a concentration from about 2 to about 12 pounds per barrel of drilling fluid.

In addition to the inhibition of shale hydration by the shale hydration inhibition agent, other properties are beneficially achieved. In particular it has been found that the shale hydration inhibition agents of the present invention may also be further characterized by their compatibility with other drilling fluid components, tolerant to contaminants, temperature stability and low toxicity. These factors contribute to the concept that the shale hydration inhibition agents of the present invention may have broad application both in land based drilling operations as well as offshore drilling operations.

The drilling fluids of the present invention include a weight material in order to increase the density of the fluid. The primary purpose for such weighting materials is to increase the density of the drilling fluid so as to prevent kick-backs and blow-outs. One of skill in the art should know and understand that the prevention of kick-backs and blow-outs is important to the safe day to day operations of a drilling rig. Thus the weight material is added to the drilling fluid in a functionally effective amount largely dependent on the nature of the formation being drilled.

Weight materials suitable for use in the formulation of the drilling fluids of the present invention may be generally selected from any type of weighting materials be it in solid, particulate form, suspended in solution, dissolved in the aqueous phase as part of the preparation process or added afterward during drilling. It is preferred that the weight material be selected from the group including barite, hematite, iron oxide, calcium carbonate, magnesium carbonate, organic and inorganic salts, and mixtures and combinations of these compounds and similar such weight materials that may be utilized in the formulation of drilling fluids.

The aqueous based continuous phase may generally be any water based fluid phase that is compatible with the formulation of a drilling fluid and is compatible with the shale hydration inhibition agents disclosed herein. In one preferred embodiment, the aqueous based continuous phase is selected from: fresh water, sea water, brine, mixtures of water and water soluble organic compounds and mixtures thereof. The amount of the aqueous based continuous phase should be sufficient to form a water based drilling fluid. This amount may range from nearly 100% of the drilling fluid to less than 30% of the drilling fluid by volume. Preferably, the aqueous based continuous phase is from about 95 to about 30% by volume and preferably from about 90 to about 40% by volume of the drilling fluid.

In addition to the other components previously noted, materials generically referred to as gelling materials, thinners, and fluid loss control agents, are optionally added to water base drilling fluid formulations. Of these additional materials, each can be added to the formulation in a concentration as Theologically and functionally required by drilling conditions. Typical gelling materials used in aqueous based drilling fluids are bentonite, sepiolite, clay, attapulgite clay, anionic high-molecular weight polymers and biopolymers.

Thinners such as lignosulfonates are also often added to water-base drilling fluids. Typically lignosulfonates, modified lignosulfonates, polyphosphates and tannins are added. In other embodiments, low molecular weight polyacrylates can also be added as thinners. Thinners are added to a drilling fluid to reduce flow resistance and control gelation tendencies. Other functions performed by thinners include reducing filtration and filter cake thickness, counteracting the effects of salts, minimizing the effects of water on the formations drilled, emulsifying oil in water, and stabilizing mud properties at elevated temperatures.

A variety of fluid loss control agents may be added to the drilling fluids of the present invention that are generally selected from a group consisting of synthetic organic polymers, biopolymers, and mixtures thereof. The fluid loss control agents such as modified lignite, polymers, modified starches and modified celluloses may also be added to the water base drilling fluid system of this invention. In one embodiment it is preferred that the additives of the invention should be selected to have low toxicity and to be compatible with common anionic drilling fluid additives such as polyanionic carboxymethylcellulose (PAC or CMC), polyacrylates, partially-hydrolyzed polyacrylamides (PHPA), lignosulfonates, xanthan gum, mixtures of these and the like.

The drilling fluid of the present invention may further contain an encapsulating agent generally selected from the group consisting of synthetic organic, inorganic and biopolymers and mixtures thereof. The role of the encapsulating agent is to absorb at multiple points along the chain onto the clay particles, thus binding the particles together and encapsulating the cuttings. These encapsulating agents help improve the removal of cuttings with less dispersion of the cuttings into the drilling fluids. The encapsulating agents may be anionic, cationic, amphoteric, or non-ionic in nature.

Other additives that could be present in the drilling fluids of the present invention include products such as lubricants, penetration rate enhancers, defoamers, corrosion inhibitors and loss circulation products. Such compounds should be known to one of ordinary skill in the art of formulating aqueous based drilling fluids.

The method of using of the above-disclosed fluids as drilling fluids is contemplated as being within the scope of the present invention. Such use would be conventional to the art of drilling subterranean wells and one having skill in the art should appreciate such processes and applications. The use of the above fluids in the slurification and disposal of drilling cuttings containing swellable shale clays is also contemplated. It is also contemplated that these fluids may be used in a wide variety of subterranean well operations in which the prevention of the swelling of gumbo shale clays and other similar formations is desired. Such uses include use as a packing fluid, fracturing fluid, reworking fluid, well bore fluid recompletion fluid and the like where the properties of the fluid will be useful.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

Unless otherwise stated, all starting materials are commercially available and standard laboratory techniques and equipment are utilized. The tests were conducted in accordance with the procedures in API Bulletin RP 13B-2, 1990. The following abbreviations are sometimes used in describing the results discussed in the examples:

"PV" is plastic viscosity (CPS) which is one variable used in the calculation of viscosity characteristics of a drilling fluid.

"YP" is yield point (lbs/100 ft$^2$) which is another variable used in the calculation of viscosity characteristics of drilling fluids.

"GELS" (lbs/100 ft$^2$) is a measure of the suspending characteristics and the thixotropic properties of a drilling fluid.

"F/L" is API fluid loss and is a measure of fluid loss in milliliters of drilling fluid at 100 psi.

EXAMPLE 1

The shale hydration inhibition agents used in the illustrative examples were made by reacting Jeffamine with 2 equivalents of ethylene oxide. The product of the above reaction was used to formulate an aqueous based drilling fluid in the following manner.

To demonstrate the superior performance of this invention, our first study was designed to determine the maximum amount of API bentonite that can be inhibited by a single 10.5 pound per barrel treatment of shale inhibitor (I) over a period of days.

This test uses one-barrel equivalent of tap water with 10.5 ppb of shale inhibitor (I). Tap water was used as control. All samples were adjusted to at least a pH of 9 and treated with a 20 ppb portion of M-I Gel (bentonite) at a medium rate of shear. After stirring for 30 minutes, the rheologies were measured and then the samples were aged overnight at 150° F. After the samples were cooled their rheologies and pH were recorded. All samples were then adjusted to at least a pH 9 before treating them again with bentonite as previously described. This procedure was carried out for each sample until they were too thick to measure. The results of this evaluation are given in Table 1 and shows the improved shale inhibition performance of the shale inhibition agent (I) of this invention.

TABLE 1

| Bentonite (16/bbl) | Base | (I) |
|---|---|---|
| 600 rpm Rheologies - Heat Aged (150° F.) | | |
| 20 | 34 | 7 |
| 40 | 300+ | 21 |
| 60 | | 75 |
| 80 | | 300+ |
| 3 rpm Rheologies - Heat Aged (150° F.) | | |
| 20 | 1 | 1 |
| 40 | 132 | 2 |
| 60 | | 4 |
| 80 | | 34 |
| 10 Min. Gel - Heat Aged (150° F.) | | |
| 20 | 4 | 1 |
| 40 | 184 | 3 |
| 60 | | 4 |
| 80 | | 62 |

TABLE 1-continued

| Bentonite (16/bbl) | Base | (I) |
|---|---|---|
| Yield Point - Heat Aged (150° F.) | | |
| 20 | 8 | 1 |
| 40 | — | 3 |
| 60 | — | 15 |
| 80 | — | — |

Upon review of the above, one of ordinary skill in the art should understand and appreciate that the drilling fluids formulated in accordance with the present invention exhibit good shale clay inhibiting characteristics and properties. Further it should be appreciated that such fluids will be useful in drilling wells and carrying out other activities in which hydration of shale clay is not desired.

EXAMPLE 2

To demonstrate the superior performance of this invention for use in slurification and disposal of drilling cuttings containing swellable shale clays, we conducted a study to determine the maximum amount of API bentonite and OCMA clay that can be inhibited by a single 10.5 pound per barrel treatment of shale inhibitor (I) over a period of days when added to an existing field mud or a laboratory prepared drilling fluid. (Generic Mud #7, Table 9)

This test uses one-barrel equivalent of mud with 10.5 ppb of shale inhibitor (I). All samples are treated with a 10 ppb portion of M-I Gel (bentonite) at a medium rate of shear. After stirring for 30 minutes, the rheologies were measured and then the samples were cooled overnight at 150° F. After the samples were cooled their rheologies and pH were recorded. All samples were then adjusted to at least pH 9 before treating them again with bentonite as previously described. This procedure was carried out for each sample until all were too thick to measure. The results of this evaluation are given in tables 2 thru 4 and shows the improved shale inhibition performance of the shale inhibition agent (I) of this invention.

TABLE 2

Generic Mud #7 Bentonite Contamination

| Bentonite (16/bbl) | Base | (I) |
|---|---|---|
| 600 rpm Rheologies - Heat Aged (150° F.) | | |
| 0 | 51 | 55 |
| 10 | 110 | 58 |
| 20 | 300+ | 133 |
| 30 | | 300+ |
| 3 rpm Rheologies - Heat Aged (150° F.) | | |
| 0 | 3 | 1 |
| 10 | 12 | 2 |
| 20 | | 8 |
| 10 Min Gel - Heat Aged (150° F.) | | |
| 0 | 20 | 9 |
| 10 | 93 | 11 |
| 20 | | 78 |
| Yield Point - Heat Aged (150° F.) | | |
| 0 | 7 | 2 |
| 10 | 30 | 4 |
| 20 | | 21 |

TABLE 3

Generic Mud #7 OCMA Clay Contamination

| OCMA Clay (16/bbl) | Base | (I) |
|---|---|---|
| 600 rpm Rheologies - Heat Aged (150° F.) | | |
| 0 | 64 | 49 |
| 10 | 83 | 67 |
| 20 | 155 | 88 |
| 30 | 300+ | 164 |
| 40 | | 300+ |
| 3 rpm Rheologies - Heat Aged (150° F.) | | |
| 0 | 2 | 2 |
| 10 | 5 | 2 |
| 20 | 18 | 5 |
| 30 | | 15 |
| 40 | | 69 |
| 10 Min Gel - Heat Aged (150° F.) | | |
| 0 | 14 | 3 |
| 10 | 50 | 8 |
| 20 | 104 | 20 |
| 30 | | 94 |
| 40 | | 110 |
| Yield Point - Heat Aged (150° F.) | | |
| 0 | 4 | 1 |
| 10 | 21 | 7 |
| 20 | 61 | 22 |
| 30 | | 50 |
| 40 | | — |

TABLE 4

Field Mud - Lignosulfonate Mud
Hunt Oil Company - LaFourche Parish, Louisiana (13.76 ppg)

| Bentonite (16/bbl) | Base | (I) |
|---|---|---|
| 600 rpm Rheologies - Heat Aged (150° F.) | | |
| 0 | 59 | 48 |
| 10 | 82 | 57 |
| 20 | 201 | 74 |
| 30 | 300+ | 145 |
| 40 | | 300+ |
| 3 rpm Rheologies - Heat Aged (150° F.) | | |
| 0 | 1 | 1 |
| 10 | 4 | 2 |
| 20 | 58 | 5 |
| 30 | | 31 |
| 40 | | 88 |
| 10 Min Gel - Heat Aged (150° F.) | | |
| 0 | 34 | 19 |
| 10 | 19 | 7 |
| 20 | 133 | 35 |
| 30 | | 99 |
| Yield Point - Heat Aged (150° F.) | | |
| 0 | 11 | 7 |
| 10 | 12 | 5 |
| 20 | 128 | 17 |
| 30 | | 57 |

Upon review of the above, one of ordinary skill in the art should understand and appreciate that the drilling fluids formulated in accordance with the present invention exhibit good shale clay inhibiting characteristics and properties. Further it should be appreciated that such fluids will be useful in drilling wells and carrying out other activities in which hydration of shale clay is not desired.

EXAMPLE 3

Dispersion tests were run with Foss Eikland and Arne cuttings by hot rolling 10 gms of cuttings in a one-barrel equivalent of field muds for 16 hours at 150° F. After hot rolling the remaining cuttings were screened using a 20 mesh screen and washed with 10% potassium chloride water, dried and then weighed to obtain the percentage recovered. The results of this evaluation are given in the following Tables (5, 6, and 7) and shows the improved shale inhibition performance of shale inhibition agent (I) of this invention. The field mud used Tables 5 and 6 was a chrome free lignosulfonate water based mud, 16.82 pounds per gallon weighed with barite from Anadarko, Jackson Parish, La. and the field mud in Table 7 was a potassium based lignite water based mud, 11.78 pounds per gallon weighed with barite from E.O.G., Washington County, Tex.

TABLE 5

Shale Dispersion Test
Foss Eikland Cuttings (4.6–8.0 mm)

|  | Total Recovered |
| --- | --- |
| Base Field Mud (16.8 ppb) | 74.0% |
| Base Field Mud (16.8 ppb) + 10.5 ppb (I) | 85.3% |

TABLE 6

Shale Dispersion Test
Annie Cuttings (4.6–8.0 mm)

|  | Total Recovered |
| --- | --- |
| Base Field Mud (16.8 ppb) | 0.0% |
| Base Field Mud (16.8 ppb) + 10.5 ppb (I) | 30.2% |

TABLE 7

Shale Dispersion Test
Foss Eikland Cuttings (4.6–8.0 mm)

|  | Total Recovered |
| --- | --- |
| Base Field Mud (11.78 ppb) | 53.3% |
| Base Field Mud (11.78 ppb) + 21 ppb (I) | 78.0% |

Mineralogy and Cation Exchange Capacity (CEC) for Standard Clays Used in Inhibition Tests

TABLE 8

|  | Arne | Foss Eikland |
| --- | --- | --- |
| Quartz | 9 | 39 |
| Feldspar | 1 | 10 |
| Calcite |  | 4 |
| Dolomite |  | 1 |
| Cristobalite |  | 3 |
| Siderite |  |  |
| Pyrite |  |  |
| Kaolinite | 45 |  |
| Mica |  |  |
| Chlorite |  | 15 |
| Illite | 30 | 15 |
| Smectite | 15 | 13 |
| CEC | 12 | 10 |

TABLE 9

Formulation of Generic Mud #7

| Ingredient | 1 bbl |
| --- | --- |
| 1. Seawater (20 ppt) | 140 ml |
| 2. Sea Salt | 3 gm |
| 3. Deionized Water | 140 ml |
| 4. M-I Gel | 35 gm |
| 5. Tannathin | 3 gm |
| 6. Caustic Soda | 2 gm |
| 7. CMC Lo Vis | 1 gm |
| 8. Spersene | 3 gm |
| 9. Rev Dust | 50 gm |
| 10. Soda Ash | 1 gm |
| 11. Lime | 1 gm |
| 12. M-I Bar | 160 gm |

Upon review of the above, one of ordinary skill in the art should understand and appreciate that the drilling fluids formulated in accordance with the present invention exhibit good shale clay inhibiting characteristics and properties. Further it should be appreciated that such fluids will be useful in drilling wells and carrying out other activities in which hydration of shale clay is not desired.

In view of the above disclosure, one of skill in the art should understand and appreciate that one illustrative embodiment of the present invention includes a water based drilling fluid for use in drilling a subterranean well through a subterranean formation that swells in the presence of water. Such an illustrative drilling fluid is formulated to include; an aqueous based continuous phase; a weight material; and a shale hydration inhibition agent having the generic formula

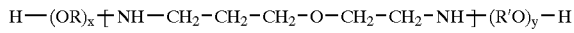

in which R and R' are independently selectable alkyl group having 2 to 4 carbon atoms, and x and y have independently selected values such that the sum of x and y is at least 1. The shale hydration inhibition agent is present in sufficient concentration to reduce the swelling of the subterranean formation in the presence of water. In one preferred illustrative embodiment, the alkylene groups R and R' are selected from ethyl, n-propyl, 2-methyl ethyl, n-butyl and other simple saturated alkyl groups.

As previously noted above, the shale hydration inhibition agent is preferably the product of the reaction of ethylene oxide with an oxyalkyldiamine having the formula

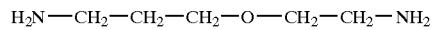

The reaction is carried out under conditions such that the ethylene oxide reacts with the amine groups of the oxyalkyldiamine. The molar ratio of ethylene oxide to oxyalkyldiamine is between about 1:1 to about 20:1. Alternatively, the shale hydration inhibition agent is the product of the reaction of propylene oxide with an oxyalkyldiamine having the same formula. As with ethylene oxide reaction, the molar ratio of propylene oxide to oxyalkyldiamine is between about 1:1 to about 20:1.

In one embodiment, the aqueous based continuous phase is selected from: fresh water, sea water, brine, mixtures of water and water soluble organic compounds and including mixtures of these fluids and similar aqueous fluids well known to one of skill in the art. The drilling fluid may also contain a fluid loss control agent selected from organic polymers, starches, including mixtures of these and similar agents well known to one of skill in the art. Further, the drilling fluid may contain a weight material that is preferably selected from barite, hematite, iron oxide, calcium carbonate, magnesium carbonate, water soluble organic and inorganic salts, calcium chloride, calcium bromide, magnesium chloride, zinc halides, including combinations of these agents and similar such weighting agents well known to one of skill in the art.

Another illustrative embodiment of the present invention includes a water based drilling fluid for use in drilling a subterranean well through a subterranean formation that swells in the presence of water. In such an illustrative embodiment, the drilling fluid includes: an aqueous based continuous phase; a weight material and a shale hydration inhibition agent as described herein. Preferably the shale hydration inhibition agent is selected from compounds having the formula:

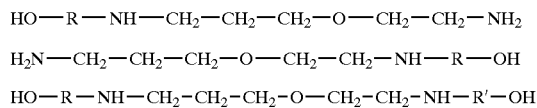

in which R and R' are independently selected alkylene groups having 2 to 4 carbon atoms and mixtures of such compounds. The shale hydration inhibition agent is present in sufficient concentration to reduce the swelling of the subterranean formation in the presence of water. In one illustrative embodiment, R and R' are ethyl groups and in another alternative embodiment, R and R' are iso-propyl groups. The drilling fluid is formulated such that the aqueous based continuous phase is selected from: fresh water, sea water, brine, mixtures of water and water soluble organic compounds and mixtures of these and similar aqueous fluids well known to one of skill in the art. The drilling fluid can optionally be formulated to contain a fluid loss control agent selected from organic polymers, starches, including mixtures of these compounds and similar compounds that are well known to one of skill in the art. Suitable weighting agents are preferably selected from barite, hematite, iron oxide, calcium carbonate, magnesium carbonate, water soluble organic and inorganic salts, calcium chloride, calcium bromide, magnesium chloride, zinc halides, combinations of these compounds and others well known to one of ordinary skill in the art.

The present invention also encompasses a water based drilling fluid for use in drilling a subterranean well through a subterranean formation that swells in the presence of water. Such an illustrative drilling fluid includes: an aqueous based continuous phase; a weight material; and a shale hydration inhibition agent that is the product of the reaction of an alkylene oxide with a oxyalkyldiamine. Generally, the oxyalkyldiamine has the formula

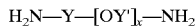

in which Y and Y' are alkyl groups having 1 to 6 carbon atoms and x is a value from about 1 to about 10. As with the other fluids of the present invention, the shale hydration inhibition agent is present in sufficient concentration to reduce the swelling of the subterranean formation in the presence of water. The alkylene oxide may be any reactive alkylene oxide group but it is preferably selected from ethylene oxide, propylene oxide, and butylene oxide. In one example of the present illustrative embodiment the molar ratio of alkylene oxide to oxyalkyldiamine is greater than 1:2. That is to say the molar ratio of alkylene oxide to oxyalkyldiamine may be from about 1:2 resulting in reaction products previously described above. Or if desired, the molar ratio may be adjusted to values such as 1:1, 2:1, 3:1 and so forth including fractional values.

It should also be appreciated that the fluids of the present invention may be used as the basis for fluids used in other operations associated with subterranean wells and the drilling of such wells. Examples of such alternative uses include use as a clear brine drilling fluid or as the basis for a formation fracturing fluid, a formation packing fluid, a well packing and/or stability fluid, a well logging fluid, well reworking fluid and the like. The following patents are representative of the methods and other potential uses for the fluids of the present invention: U.S. Pat. No. 6,063,737 (describing an aqueous displacement fluid); U.S. Pat. No. 6,213,213 (describing viscosified aqueous well treating compositions); U.S. Pat. No. 5,558,161 (describing a aqueous gel fluids for formation fracturing); U.S. Pat. No. 5,789,352 (describing a well completion and spacer fluid); U.S. Pat. No. 3,956,141 (describing a clear brine drilling fluid); U.S. Pat. No. 4,792,412 (describing a clear brine drilling fluid); U.S. Pat. No. 5,480,863 (describing a clear brine drilling fluid); U.S. Pat. No. 5,614,728 (describing a clear brine drilling fluid); U.S. Pat. No. 5,804,535 (describing a clear brine drilling fluid); and U.S. Pat. No. 6,124,244 (describing a clear brine drilling fluid), all of the contents of each of these patents being incorporated by reference into the present disclosure.

Additionally, it should also be appreciated that the fluids of the present invention can be used in the disposal of drill cuttings that contain swellable shale clay materials. Generally the method of disposing of drill cuttings by injection includes the separation of the drill cuttings from the drilling fluid, grinding or slurrification of the drill cuttings in a liquid medium and then injection of the slurry into a subterranean formation that is the target of the disposal operation. The methods and techniques of such disposal processes should be well known to one of skill in the art. The following U.S. patents are representative of the methods and other potential uses for the fluids of the present invention: U.S. Pat. Nos. 4,942,929; 5,129,469; 5,226,749; 5,310,285; 5,314,265; 5,405,224; 5,589,603; 5,961,438; 5,339,912; 5,358,049; 5,405,223; 5,589,603; 5,662,169; and 6,106,733; and 6,119,779, all of the contents of each of these patents being incorporated by reference into the present disclosure. Thus the present invention also encompasses a water-base fluid for use in the slurrification and injection of drill cuttings into a subterranean formation for disposal. Such a fluid is especially useful in circumstances when the drill cuttings include water swellable clays and shale clays.

In view of the foregoing, one illustrative fluid useful in the slurrification and injection of drill cuttings into a subterranean formation for disposal includes: an aqueous based continuous phase, and a shale hydration inhibition agent as substantially described above. In one preferred embodiment, the shale hydration inhibition agent has the formula:

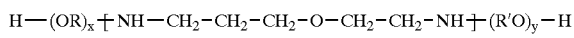

in which R and R' are independently selectable alkyl groups having 2 to 4 carbon atoms, and wherein x and y have independently selected values such that the sum of x and y is at least 1.

Such an illustrative fluid includes: an aqueous based continuous phase, and a shale hydration inhibition agent that is the product of the reaction of an alkylene oxide with a oxyalkyldiamine. Generally, the oxyalkyldiamine has the formula

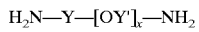

in which Y and Y' are alkyl groups having 1 to 6 carbon atoms and x is a value from about 1 to about 10. The alkylene oxide may be any reactive alkylene oxide group but it is preferably selected from ethylene oxide, propylene oxide, and butylene oxide. In one example of the present illustrative embodiment the molar ratio of alkylene oxide to oxyalkyldiamine is greater than 1:2. That is to say the molar ratio of alkylene oxide to oxyalkyldiamine may be from about 1:2 resulting in reaction products previously described above. Or if desired, the molar ratio may be adjusted to values such as 1:1, 2:1, 3:1 and so forth including fractional values.

In the above slurrification fluids, the shale hydration inhibition agent is present in the drilling fluid in sufficient concentrations to reduce the swelling of shale clay that may be contained in the drill cuttings. A preferred embodiment of the illustrative fluids is formulated such that the aqueous based continuous phase is selected from: fresh water, sea water, brine, mixtures of water and water soluble organic compounds and mixtures of these. The fluid may optionally contain a fluid loss control agent selected from the organic polymers, starches, and mixtures thereof as well as any of the other optional components previously mentioned.

One of skill in the art should also appreciate that the present invention includes a method of disposing of drill cuttings that include a water swellable shale clay, into a subterranean formation. Such an illustrative method includes: grinding the drill cuttings in a water-base fluid to form a slurry, and injecting said slurry into said subterranean formation. The water based fluid is that described above and preferably contains: an aqueous based continuous phase and a shale hydration inhibition agent as previously described above. A preferred embodiment includes a shale hydration inhibition agent that is the product of the reaction of an alkylene oxide with a oxyalkyldiamine. Generally, the oxyalkyldiamine has the formula

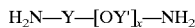

in which Y and Y' are alkyl groups having 1 to 6 carbon atoms and x is a value from about 1 to about 10. The alkylene oxide may be any reactive alkylene oxide group but it is preferably selected from ethylene oxide, propylene oxide, and butylene oxide. In one example of the present illustrative embodiment the molar ratio of alkylene oxide to oxyalkyldiamine is greater than 1:2. That is to say the molar ratio of alkylene oxide to oxyalkyldiamine may be from about 1:2 resulting in reaction products previously described above. Or if desired, the molar ratio may be adjusted to values such as 1:1, 2:1, 3:1 and so forth including fractional values. As with the other fluids of the present invention, the shale hydration inhibition agent is present in sufficient concentration to reduce the swelling of the shale clay present in the drilling cuttings.

While the compositions and methods of this invention have been described in terms of preferred embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A water based drilling fluid for use in drilling a subterranean well through a subterranean formation that swells in the presence of water, the drilling fluid comprising:

an aqueous based continuous phase;

a weight material a shale hydration inhibition agent having the formula

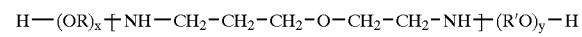

wherein R and R' are independently selectable alkylene group having 2 to 4 carbon atoms, and wherein x and y have independently selected values such that the sum of x and y is at least 1, and wherein the shale hydration inhibition agent is present in sufficient concentration to reduce the swelling of the subterranean formation in the presence of water.

2. The drilling fluid of claim 1 wherein R and R' are selected from ethylene, n-propylene, 2-methyl ethylene, and n-butylene.

3. The drilling fluid of claim 1 wherein the shale hydration inhibition agent is the product of the reaction of ethylene oxide with a oxyalkyldiamine having the formula

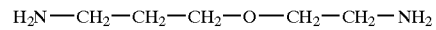

4. The drilling fluid of claim 3 wherein the molar ratio of ethylene oxide to oxyalkyldiamine is between about 1:1 to about 20:1.

5. The drilling fluid of claim 1 wherein the shale hydration inhibition agent is the product of the reaction of propylene oxide with a oxyalkyldiamine having the formula

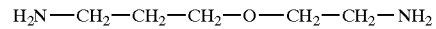

6. The drilling fluid of claim 3 wherein the molar ratio of propylene oxide to oxyalkyldiamine is between about 1:1 to about 20:1.

7. The drilling fluid of claim 1 wherein the aqueous based continuous phase is selected from: fresh water, sea water, brine, mixtures of water and water soluble organic compounds and mixtures thereof.

8. The drilling fluid of claim 1 wherein the drilling fluid further contain a fluid loss control agent selected from the group consisting of organic polymers, starches, and mixtures thereof.

9. The drilling fluid of claim 1 wherein the weight material is selected from the group consisting of barite, hematite, iron oxide, calcium carbonate, magnesium carbonate, water soluble organic and inorganic salts, calcium chloride, calcium bromide, magnesium chloride, zinc halides and combinations thereof.

10. A water based drilling fluid for use in drilling a subterranean well through a subterranean formation that swells in the presence of water, the drilling fluid comprising:

an aqueous based continuous phase;

a weight material a shale hydration inhibition agent selected from the group:

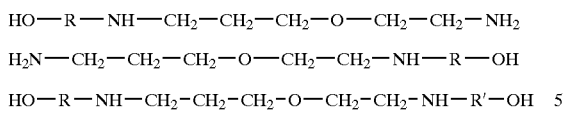

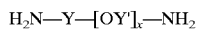

wherein R and R' are independently selected alkylene groups having 2 to 4 carbon atoms and mixtures thereof, and wherein the shale hydration inhibition agent is present in sufficient concentration to reduce the swelling of the subterranean formation in the presence of water.

11. The drilling fluid of claim 10 wherein R and R' are ethyl groups.

12. The drilling fluid of claim 10 wherein R and R' are propyl groups.

13. The drilling fluid of claim 10 wherein the aqueous based continuous phase is selected from: fresh water, sea water, brine, mixtures of water and water soluble organic compounds and mixtures thereof.

14. The drilling fluid of claim 10 wherein the drilling fluid further contain a fluid loss control agent selected from the group consisting of organic polymers, starches, and mixtures thereof.

15. The drilling fluid of claim 1 wherein the weight material is selected from the group consisting of barite, hematite, iron oxide, calcium carbonate, magnesium carbonate, organic and inorganic salts, calcium chloride, calcium bromide, magnesium chloride, zinc halides and combinations thereof.

16. A water based drilling fluid for use in drilling a subterranean well through a subterranean formation that swells in the presence of water, the drilling fluid comprising:
    an aqueous based continuous phase;
    a weight material
    a shale hydration inhibition agent that is the product of the reaction of an alkylene oxide with an oxyalkyldiamine having the formula

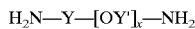

wherein Y and Y' are alkyl groups having 1 to 6 carbon atoms and x is a value from about 1 to about 10, and wherein the shale hydration inhibition agent is present in sufficient concentration to reduce the swelling of the subterranean formation in the presence of water.

17. The water based drilling fluid of claim 16, wherein the alkylene oxide is selected from ethylene oxide, propylene oxide, and butylene oxide.

18. The water based drilling fluid of claim 16 wherein the molar ratio of alkylene oxide to oxyalkyldiamine is greater than 1:2.

19. A method of forming a subterranean well, the method comprising
    drilling the subterranean well with a rotary drill bit and a drilling fluid; said drilling fluid including:
    an aqueous based continuous phase and
    a shale hydration inhibition agent that is the product of the reaction of an alkylene oxide with a oxyalkyldiamine having the formula $H_2N-Y-[OY']_x-NH_2$ wherein Y and Y' are alkyl groups having 1 to 6 carbon atoms and x is a value from about 1 to about 10, and wherein the shale hydration inhibition agent is present in sufficient concentration to reduce the swelling of shale clay encountered during the drilling of the subterranean well.

20. A method of reducing the swelling of shale clay encountered during the drilling of a subterranean well, the method comprising:
    circulating in the subterranean well a water-base drilling fluid including:
    an aqueous based continuous phase and
    a shale hydration inhibition agent that is the product of the reaction of an alkylene oxide with a oxyalkyldiamine having the formula

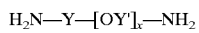

wherein Y and Y' are alkyl groups having 1 to 6 carbon atoms and x is a value from about 1 to about 10, and wherein the shale hydration inhibition agent is present in sufficient concentration to reduce the swelling of the clay.

21. A drilling fluid for use in drilling subterranean wells, said fluid comprising:
    an aqueous based continuous phase,
    a viscosifying agent, and
    a shale hydration inhibition agent that is the product of the reaction of an alkylene oxide with a oxyalkyldiamine having the formula

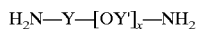

wherein Y and Y' are alkylene groups having 1 to 6 carbon atoms and x is a value from about 1 to about 10 and wherein the shale hydration inhibition agent is present in sufficient concentration to reduce the swelling of shale clay.

22. A fluid for use in subterranean wells, said fluid comprising:
    an aqueous based continuous phase,
    a viscosifying agent, and
    a shale hydration inhibition agent that is the product of the reaction of an alkylene oxide with a oxyalkyldiamine having the formula

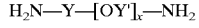

wherein Y and Y' are alkyl groups having 1 to 6 carbon atoms and x is a value from about 1 to about 10 and wherein the shale hydration inhibition agent is present in sufficient concentration to reduce the swelling of shale clay.

* * * * *